(12) United States Patent
Wang

(10) Patent No.: US 10,714,792 B1
(45) Date of Patent: Jul. 14, 2020

(54) INTEGRALLY-FORMED RECHARGEABLE BATTERY AND PRODUCTION METHOD THEREOF

(71) Applicant: SHENZHEN ORIENTAL WILLING NEW ENERGY CO., LTD, Shenzhen (CN)

(72) Inventor: Kunli Wang, Shenzhen (CN)

(73) Assignee: SHENZHEN ORIENTAL WILLING NEW ENERGY CO., LTD, Shenzhen (CN)

( * ) Notice: Subject to any disclaimer, the term of this patent is extended or adjusted under 35 U.S.C. 154(b) by 0 days.

(21) Appl. No.: 16/780,934

(22) Filed: Feb. 4, 2020

(30) Foreign Application Priority Data

Dec. 12, 2019 (CN) .......................... 2019 1 1273085
Jan. 20, 2020 (CN) .......................... 2020 1 0067767

(51) Int. Cl.
| | |
|---|---|
| H01M 10/42 | (2006.01) |
| H01M 10/04 | (2006.01) |
| H01M 2/02 | (2006.01) |
| H01M 2/26 | (2006.01) |
| H01M 10/0525 | (2010.01) |

(52) U.S. Cl.
CPC ......... *H01M 10/425* (2013.01); *H01M 2/022* (2013.01); *H01M 2/26* (2013.01); *H01M 10/0422* (2013.01); *H01M 10/0525* (2013.01)

(58) Field of Classification Search
None
See application file for complete search history.

(56) References Cited

U.S. PATENT DOCUMENTS

| | | | | |
|---|---|---|---|---|
| 9,054,541 | B2* | 6/2015 | Morita | ................ H01M 2/1022 |
| 10,224,582 | B2* | 3/2019 | Zhang | ................... H02J 7/0029 |
| 2011/0163712 | A1* | 7/2011 | Chen | ......................... H02J 7/00 |
| | | | | 320/107 |
| 2013/0181661 | A1* | 7/2013 | Workman | ................. H02J 7/00 |
| | | | | 320/107 |

* cited by examiner

*Primary Examiner* — Wojciech Haske

(57) ABSTRACT

The present invention discloses an integrally-formed rechargeable battery and a production method thereof. The integrally-formed rechargeable battery includes an integrally-formed metal sleeve, which serves as a negative electrode conductor of the lithium battery. The integrally-formed metal sleeve is a cylindrical case, an end surface of one side of the integrally-formed metal sleeve is of a closed structure, and an end surface of the other side of the integrally-formed metal sleeve is an annular portion with a hole in the middle, A cell assembly is installed within the integrally-formed metal sleeve. The cell assembly includes a cell, a circuit board, an exposed charging interface and a positive electrode conductor. The positive electrode conductor is exposed from the hole in the middle of the annular portion.

10 Claims, 10 Drawing Sheets

INTEGRALLY-FORMED RECHARGEABLE BATTERY AND PRODUCTION METHOD THEREOF

TECHNICAL FIELD

The present invention relates to the technical field of lithium batteries, and more particularly to an integrally-formed rechargeable battery and a production method thereof.

BACKGROUND

Batteries are commonly used in daily life, such as a remote controller and a toy car. Most of existing batteries are disposable batteries. These batteries are discarded after running out of power. If these batteries are used for a long time, they are higher in cost. These discarded batteries easily pollute the environment. Accordingly, a rechargeable battery arises. The rechargeable battery may be recharged after running out of power due to its rechargeable characteristic, which may greatly reduce the cost of using the batteries. The existing rechargeable battery is unreliable and unreasonable in structure. Generally, with respect to the existing rechargeable battery, a charging circuit board is disposed at a positive electrode position of the battery. It is necessary for two nickel strips to connect with a positive electrode and a negative electrode of a cell and a head portion of the cell to be sharpened. The battery is wrapped with a tubular steel sleeve as a whole. Such a structure has a desoldering risk due to the adoption of the nickel strips for connection. An opening of the steel sleeve has burrs, which easily damage an outer film of the battery. There is a mark in a joint between the steel sleeve and a cell, resulting in unevenness.

SUMMARY

An objective of the present invention: in order to overcome the disadvantages in the prior art, the present invention provides an integrally-formed rechargeable battery with high shape integration and reliable structure, and a production method thereof.

A technical solution of the present invention: in order to achieve the above-mentioned objective, the integrally-formed rechargeable battery of the present invention includes an integrally-formed metal sleeve, which is a cylindrical case, two ends of which are provided with inward-reversing blocking portions, and the blocking portion at at least one end is an annular portion with a hole in the middle.

A cell assembly is installed within the integrally-formed metal sleeve, and the cell assembly has a cell, a circuit board, an exposed charging interface and a positive electrode conductor; and the positive electrode conductor is exposed from the hole in the middle of the annular portion.

Further, the integrally-formed metal sleeve serves as the negative electrode conductor of the rechargeable battery at the same time, and the blocking portion at one end blocks most of the one end or completely closes the one end.

Further, a negative electrode of the cell is directly in contact conduction with the integrally-formed metal sleeve or connected with the integrally-formed metal sleeve through a transition conductor, and a positive electrode of the cell is connected with the positive electrode conductor through a connection conductor.

Further, an output conductor of at least one polarity is disposed on the circuit board, and each output conductor is connected with a corresponding electrode of the cell.

Further, the cell assembly further includes an insulating frame separated between the cell and the circuit board.

Further, an indicator light hole is provided in a side wall of the integrally-formed metal sleeve, and the circuit board further has an indicator light exposed from the indicator light hole.

Further, the charging interface is formed on the circuit board by means of a sink board installing method.

Further, a negative electrode conductive ring is fixed on the circuit board, and the negative electrode conductive ring is in contact conduction with the integrally-formed metal sleeve.

Based on the above-mentioned production method of the integrally-formed rechargeable battery, the production method includes:

sealing one end of a metal pipe by employing a metal case sealing process to form a blocking portion;

loading the cell assembly into the metal pipe from the other end of the metal pipe; and sealing the other end of the metal pipe by employing the metal case sealing process to form another blocking portion. At this time, the metal pipe is formed into the integrally-formed metal sleeve, or, the production method includes:

loading the cell assembly into a metal pipe; and sealing two ends of the metal pipe by employing the metal case sealing process, respectively to form blocking portions at two ends. At this time, the metal pipe is formed into the integrally-formed metal sleeve.

Further, the production method further includes:

curling a plate into the metal pipe by a curling process, wherein clamping portions arranged in an array are disposed at one side of the plate, clamping grooves arranged in a groove are disposed at the other side of the plate, and the clamping portions are embedded within the clamping grooves after the curling is performed.

The beneficial effects of the present invention: according to the integrally-formed rechargeable battery and the production method thereof of the present invention, by disposing the integrally-formed metal sleeve with blocking portions at two ends, the cell assembly is surrounded therein, in this way, the integrally-formed rechargeable battery has a smooth appearance, and enables the overall structure of the lithium battery to be reliable. The cell assembly will not loosen, and two ends of the metal sleeve have no burrs. Accordingly, no damage to an outer film of the battery and no scratch to a user will be caused.

Figure 1:
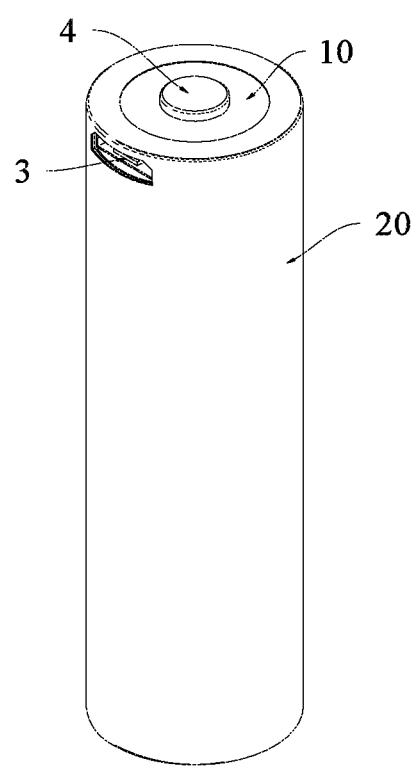
FIG. 1 is an appearance diagram of an integrally-formed rechargeable battery according to a first embodiment.

Wherein: 1, integrally-formed metal sleeve; 11, annular portion; 12, indicator light hole; 13, charging port; 2, cell; 3, charging interface; 4, positive electrode conductor; 5, connection conductor; 6, circuit board; 7, negative electrode conductive ring; 8, insulating frame; 81, annular convex portion; 82, accommodating groove; 83, recess; 9, protective gasket; 10, surface pad; 20, outer film; 30, output conductor; 40, metal pipe; 50, plate; 51, clamping portion; and 52, clamping groove.

DESCRIPTION OF THE EMBODIMENTS

In the description of the present invention, it should be understood that an orientation or position relationship indicated by terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", and the like is based on an orientation or position relationship shown in the drawings, and is only for the convenience of describing the present invention and simplifying the description rather than indicating or implying that the mentioned apparatus or element must have a specific orientation and must be constructed and operated in a specific orientation. Accordingly, these terms should not be construed as limiting the present invention. In addition, terms "first" and "second" are used for descriptive purposes only, and cannot be understood as indicating or implying the relative importance or implicitly indicating the number of indicated technical features. Therefore, features defined with "first" and "second" may explicitly or implicitly include one or more of the features. In the description of the present invention, the term "a plurality" means two or more, unless specifically defined otherwise.

In the description of the present invention, it should be noted that terms "install", "connect", and "connected" should be interpreted broadly unless otherwise explicitly stated and defined. For example, the term "connect" may refer to "fixedly connect" or "removably, connect" or "integrally connect", or "mechanically or electrically connect", or "directly connect", or "indirectly connect via an intermediate medium", or "communicate inside two elements" or an interaction relationship between two elements. For those ordinarily skilled in the art, specific meanings of the above terms in the present invention may be understood according to particular conditions.

Figure 2:
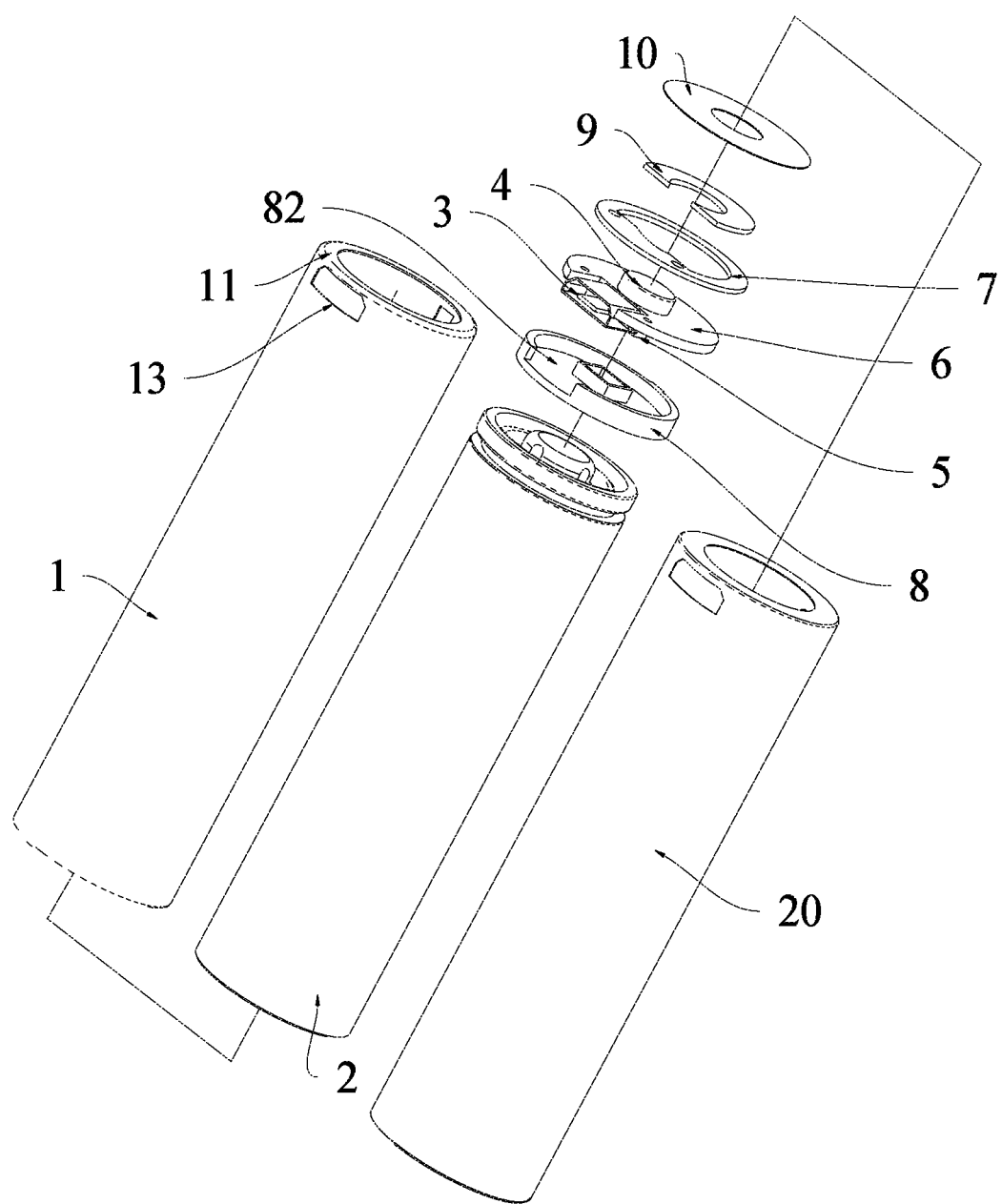
FIG. 2 is an exploded diagram of an integrally-formed rechargeable battery according to a first embodiment.
Figure 3:
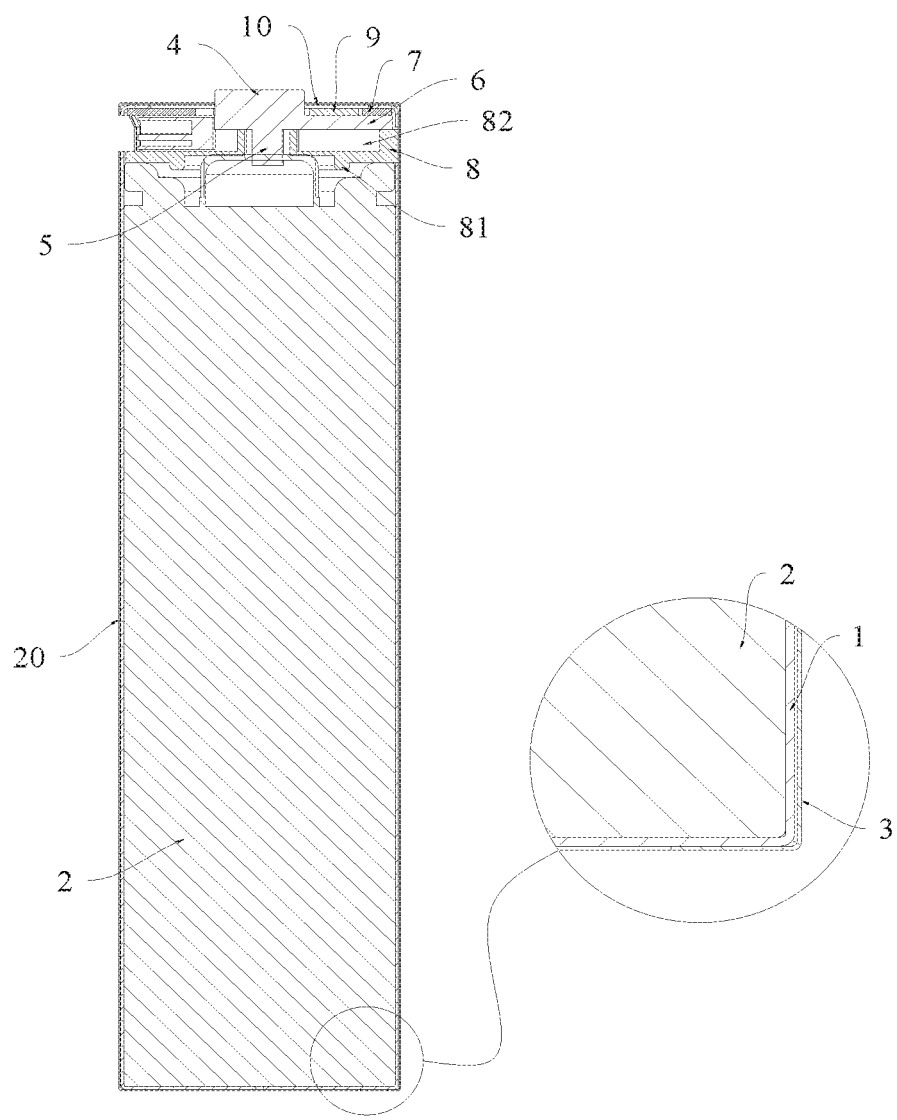
FIG. 3 is a cross-sectional diagram of an integrally-formed rechargeable battery according to a first embodiment.

The integrally-formed rechargeable battery as shown in FIG. 1 to FIG. 3 includes an integrally-formed metal sleeve 1 and a cell assembly, wherein the cell assembly is installed within the integrally-formed metal sleeve 1, a surface pad 10 is attached on one side, which corresponds to a positive electrode of the rechargeable battery, of the integrally-formed metal sleeve 1, and an outer film 20 is wrapped outside the integrally-formed metal sleeve 1. Among them, the surface pad 10 may be made of all solid insulator materials such as plastic, PET, PVC and paper. The shape of the surface pad 10 is selected according to the shape of an end portion of the integrally-formed metal sleeve 1. The color of the surface pad 10 may be any color such as black, white and color of the luminescent glow in the dark. The outer film 20 wraps sides of the integrally-formed metal sleeve 1 and peripheral portions of end faces of two sides of the integrally-formed metal sleeve 1, which may protect the battery. A wrapping manner of the outer film 20 may employ a heat-shrinkable bush, a label, a ticker and the like. The outer film 20 may be made of a heat-shrinkable material such as PET, PVC and an aluminum film.

The integrally-formed metal sleeve 1 is a cylindrical metal case, and two ends of which are provided with inward-reversing blocking portions, and the blocking portion at at least one end is an annular portion 11 with a hole in the middle. In this embodiment, the integrally-formed metal sleeve 1 is cylindrical. In other embodiments, the integrally-formed metal sleeve may be of a square cylinder, a polygonal cylinder, or other special-shaped cylinders, and the integrally-formed metal sleeve 1 is a steel sleeve, and has better abrasion resistance and good electrical conductivity because of being made of a steel material. In other embodiments, the integrally-formed metal sleeve 1 may be made of other metals and alloys with good electrical conductivity.

By employing the integrally-formed metal sleeve 1, except for a small number of exposed portions of the cell assembly, such as a positive electrode conductor 4 and a charging interface 3 included in the cell assembly, other portions are wrapped by the integrally-formed metal sleeve 1. The integrally-formed metal sleeve 1 has high integrity, flat and attractive appearance, and large wrapping range as the exposed portion of the entire rechargeable battery, which may effectively protect the cell assembly. Compared with a metal bush sleeved outside a common battery, the integrally-formed metal sleeve 1 does not damage the outer film 20 due to no sharp burrs on two sides.

Particularly, the cell assembly sequentially includes a cell 2, an insulating frame 8 and a circuit board 6 in an axial direction of the integrally-formed metal sleeve 1. Each component of the cell assembly will be particularly described below.

Among them, the cell 2 is a lithium battery cell (such as a common 18650 cell) or a polymer cell, which may be cylindrical in this embodiment, or square or other special-shaped, and the cell is matched with the integrally-formed metal sleeve 1 in shape. Such a cell is usually used in daily energy storage articles such as a power bank and is a main element for storing and releasing electrical energy. The cell 2 has a positive electrode and negative electrodes, wherein the positive electrode is located on one end surface of the cell, and the negative electrodes are located on the side wall and the other end surface of the cell.

Figure 4:
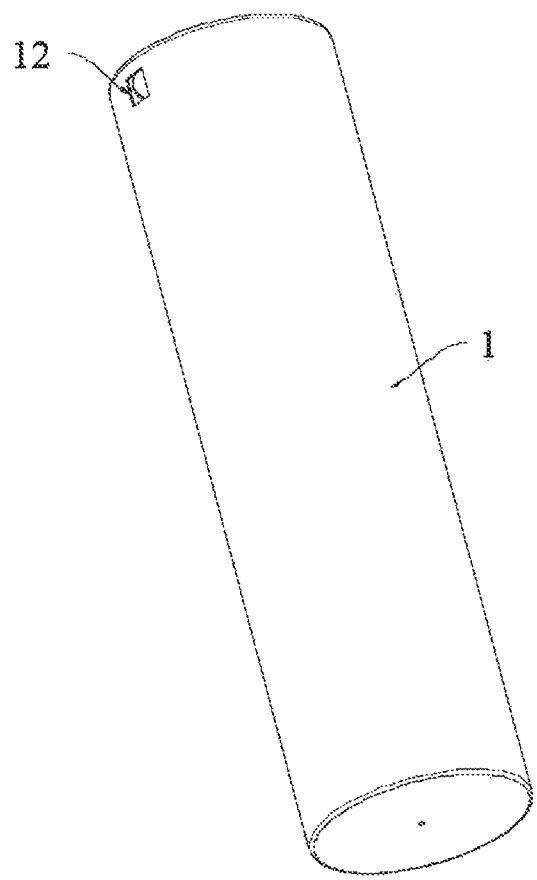
FIG. 4 is a structural diagram of an integrally-formed rechargeable battery according to a first embodiment.

In the first embodiment, a blocking portion at one end of the integrally-formed metal sleeve 1 is an annular portion 11 with a hole in the middle, and a blocking portion at the other end covers most of a region of an end portion of the other end, for example, 90% or more of the region of the other end, Only a small vent hole is reserved in the center in an end portion of the other end (as shown in FIG. 4). In other embodiments, a blocking portion at the other end may close an end portion of the other end. The cell 2 is coaxially placed within the integrally-formed metal sleeve 1, and a negative electrode of the cell 2 is disposed at the rear end, and is in direct contact with the bottom at the inner side of the integrally-formed metal sleeve 1 (in other embodiments, the negative electrode of the cell 2 and the bottom at the inner side of the integrally-formed metal sleeve 2 may be conductively connected by employing springs, nickel sheets, copper sheets and other solid conductors as transition conductors). As such, the integrally-formed metal sleeve 1 forms a negative electrode conductor of the rechargeable battery. The integrally-formed metal sleeve 1 not only plays a role in protecting the cell 2 from being squeezed or collided to cause its deformation, but also plays a role in participating in outputting electric energy as the negative electrode conductor. The above-mentioned vent hole may have a ventilation function. When the cell 1 is plugged into the integrally-molded metal sleeve 1, the cell 1 may relatively easily enter the integrally-formed metal sleeve 1 by means of the ventilation function of the vent hole.

Figure 6:
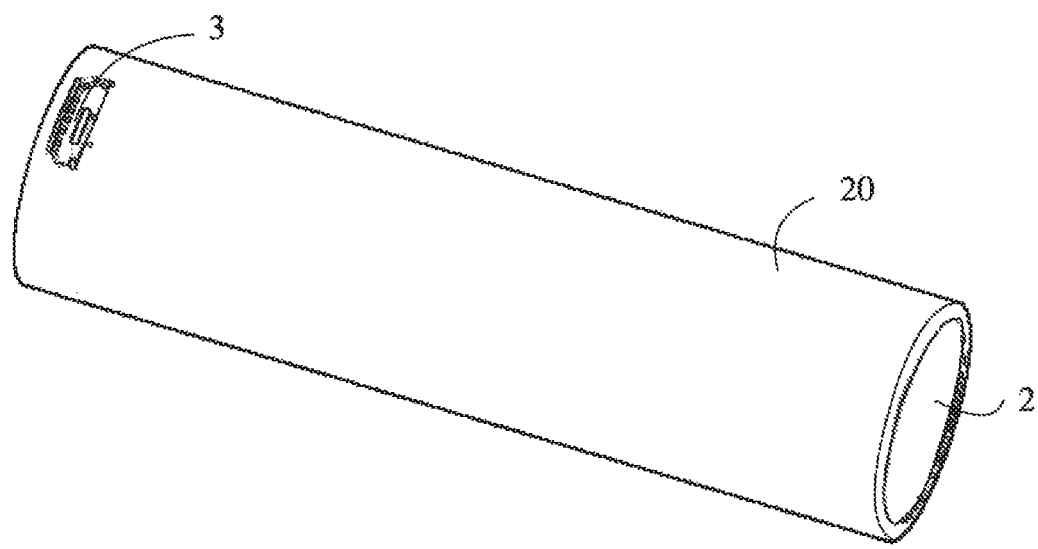
FIG. 6 is an appearance diagram of an integrally-formed rechargeable battery according to a second embodiment.
Figure 7:
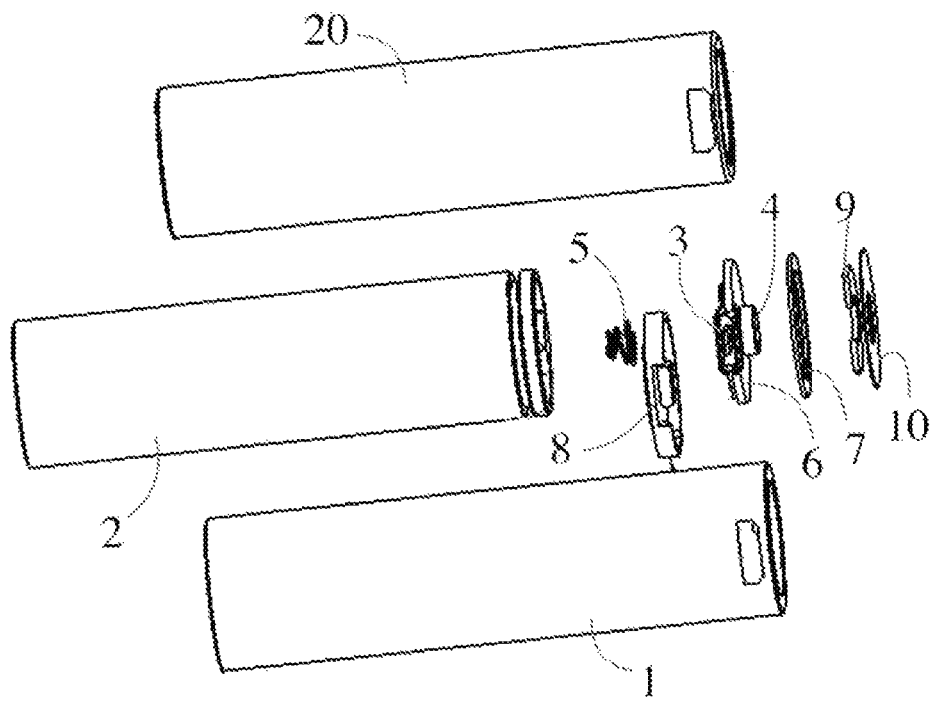
FIG. 7 is an exploded diagram of an integrally-formed rechargeable battery according to a second embodiment.

In the second embodiment, as shown in FIG. 6 to FIG. 7, two ends of the integrally-formed metal sleeve 1 are annular portions 11, a positive electrode conductor 4 is exposed from a hole in the middle of the annular portion 11 at one end of the integrally-formed metal sleeve 1, and a negative electrode of a cell 2 is exposed from a hole in the middle of the annular portion 11 at the other end of the integrally-formed metal sleeve 1. That is, the negative electrode of the cell 2 is directly locally exposed, and directly outputs electric energy to the outside.

Figure 5:
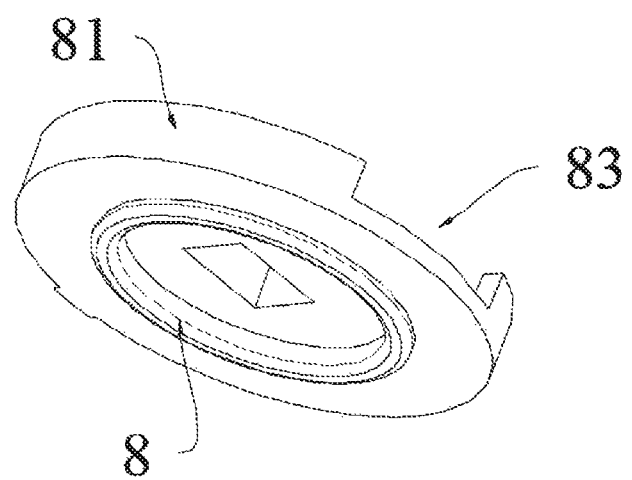
FIG. 5 is a structural diagram of an insulating frame according to a first embodiment.

The insulating frame 8 may be circular in this embodiment (an outer contour of the circuit board 6 is circular as well). In other embodiments, the insulating frame 8 may be square or other special-shaped according to the shape of a circuit board 6, The insulating frame 8 is disposed between the cell 2 and the circuit board 6, and an annular convex portion 81 (as shown in FIG. 5) matched with an end surface of a positive electrode of the cell 2 in shape is formed on one side, which is in contact with the cell 2, of the insulating frame 8, and an accommodating groove 82 for accommodating components on the circuit board 6 is formed in one side, which is in contact with the circuit board 6, of the insulating frame 8. As such, the insulating frame 8 not only plays a role in isolating the cell 2 from the circuit board 6 to mainly prevent the positive electrode of a battery from being in short circuit contact with a negative electrode of the battery, but also plays a role in surrounding and protecting the circuit board 6, enables the cell 2, the insulating frame 8 and the circuit board 6 to have a relative stable fixed support function when they are stacked together, and may enhance the overall impact resistance when the cell 2, the insulating frame 8 and the circuit board 6 are stacked together. In contrast, in the existing rechargeable battery, the circuit board is generally wrapped in a glue injection manner, Such a manner may have a certain safety risk when an explosion protection system of the cell is blocked, and is low in fixing firmness, low in impact resistance and low in production efficiency. The insulating frame 8 employed by the present invention may effectively overcome the above-mentioned defects.

The insulating frame 8 may be made of all solid non-conductors such as plastic, barley, paper and EVA.

In the first embodiment as shown in FIG. 5, a square hole is provided in the center of the insulating frame 8, and a reinforcing rib is disposed around the square hole. The square hole is configured to fit an extension portion at the bottom of the positive electrode conductor 4, The extension portion may preferably be provided as a square convex column corresponding to the square hole. As such, clamping adaption may be formed, which prevents the positive electrode conductor 4 and the circuit board 6 from rotating to increase the firmness after assembly, After passing through the square hole through the extension portion, the positive electrode conductor 4 is in direct or indirect conduction with the positive electrode of the cell 2. When the square convex column of the positive electrode conductor 4 is in direct contact conduction with the positive electrode of the cell 2 to achieve better electrical conduction, soldering points may be added between various parts requiring contact conduction. When the square convex column of the positive electrode conductor 4 is in direct conduction with the positive electrode of the cell 2, the positive electrode conductor 4 is connected with the positive electrode of the cell 2 through a connection conductor 5. The connection conductor 5 may be a spring, a nickel strip, a thimble, a copper particle, and other conductors. Preferably, the conductor 5 is the spring, the thimble and the like for realizing electrical energy conduction by means of a compression manner without welding connection via a wire, so that the connection reliability may be increased and the connection conductor 5 may not be prevented from being used due to desoldering and the like. The positive electrode conductor 4 may be made of all solid conductors such as copper, iron, aluminum, titanium and nickel, and may be circular, square, hexagonal, octagonal, polygonal, and other special-shaped according to design requirements.

In the second embodiment as shown in FIG. 7, the positive electrode conductor 4 is in connection conduction with the positive electrode of the cell 2 by employing the spring. Correspondingly, a circular convex column is disposed on the center of the insulating frame 8, and there is a circular hole in the middle of the circular convex column for the spring to pass through. In this embodiment, other structures of the insulating frame 8 are the same as the first embodiment, and will be omitted here.

The circuit board 6 serves as a charging management core of the entire rechargeable battery, which may protect the cell in a charging process and may be circular as shown in the embodiment, or may be square or other special-shaped according to design requirements. Oil may be sprayed on the surface of the circuit board 6 to become green, blue, black, red, white and any other colors. A charging interface 3 and a charging management circuit are formed on the circuit board 6, and the positive electrode conductor 4 of the rechargeable battery is further fixedly connected to the circuit board 6. One end of the charging management circuit is connected with the charging interface 3, and the other end thereof is respectively connected with the positive electrode conductor 4 and the integrally-formed metal sleeve 1. Since the positive electrode conductor 4 is fixedly connected to the circuit board 6, the positive electrode conductor 4 is communicated with the charging management circuit through an internal conductive coating on the circuit board 6. In addition, a negative electrode conductive ring 7 is fixed on the circuit board 6. Meanwhile, the circuit board 6 is in contact conduction with the integrally-formed metal sleeve 1 by means of the negative electrode conductive ring 7. Particularly, the negative electrode conductive ring 7 is annular, which is fixed on the circuit board 6 by means of a screw connection manner. The negative electrode conductive ring 7 is in contact with an annular portion 11 of the integrally-formed metal sleeve 1. A portion, which is in contact with the annular portion 11, of the negative electrode conductive ring 7 is an annular surface. As such, the circuit board 6 may connect the positive electrode conductor 4 with the negative electrode conductor of the entire rechargeable battery without conductors such as a wire, so that a case where the circuit board cannot be used normally due to malfunctions such as desoldering may be reduced.

Preferably, the charging interface 3 is formed on the circuit board 6 by a sink plate installation method, that is, a notch is formed on the circuit board 6, and the charging interface 3 is installed at the notch. As such, the charging interface 3 and the circuit board body are not in a thickness superposition relationship, which may reduce the thickness of the entire circuit board 6, so that in the same installation space, a thicker circuit board body may be employed to improve the impact resistance of the circuit board 6 and prolong the durability and service life of the circuit board 6. Furthermore, a recess 83 is provided in a side wall of an accommodating groove 82 on the insulating frame 8, and the charging interface 3 has a portion embedded in the recess 83. In this way, on the one hand, the overall installation structure of the insulating frame 8 and the circuit board 6 is relatively compact, resulting in the reduction of the overall thickness of the insulating frame 8 and the circuit board 6. On the other hand, the recess 83 may play a role in making the charging interface 3 more stable, so that the charging interface 3 will not be displaced or deformed due to frequent insertion in an external interface. In addition, the recess 83 further plays a role in facilitating relative positioning of the insulating frame 8 and the circuit board 6 in an assembling process.

The above-mentioned charging interface 3 and the positive electrode conductor 4 are both in an exposed state. Here, the exposed state refers to a visible state, rather than meaning that the exposed part must be in the exposed state. Particularly, the positive electrode conductor 4 is exposed from the hole in the middle of the annular portion 11 and has a portion protruding beyond the integrally-formed metal sleeve 1. A charging port 13 is formed in the side wall of the integrally-formed metal sleeve 1, and the charging interface 3 is disposed on the charging port 13. The charging interface 3 may be an existing interface such as a micro-charging interface, a type-C interface, a lightning interface, or a magnetic charging interface, or may be another interface with other functions in the future.

In addition, in order to indicate a state of the rechargeable battery, an indicator light hole 12 (as shown in FIG. 4) is provided in a side wall of the integrally-formed metal sleeve 1, and the circuit board 6 further has an indicator light exposed from the indicator light hole 12. The circuit board 6 may indicate the charging state of the battery by making the indicator light emit different colors of light. In the prior art, the indicator light hole 12 is generally provided in the surface pad 10, which causes that the surface pad 10 is aligned with the hole when being attached and seriously affects the efficiency of attaching the surface pad 10. In the present invention, the indicator light hole 12 is provided in the side wall of the integrally-formed metal sleeve 1, which may effectively solve this problem and improve the production efficiency.

In addition, in order to fill a portion that is not protected by the annular portion 11, a protection gasket 9 is disposed on an outward side of the circuit board 6. The protection gasket 9 may prevent an object entering the circuit board 6 from the hole in the middle of the annular portion 11 from damaging the circuit board 6. The surface pad 10 is attached to the outside of the annular portion 11 and the protection gasket 9. The surface pad 10 is made of PET or paper.

Figure 8:
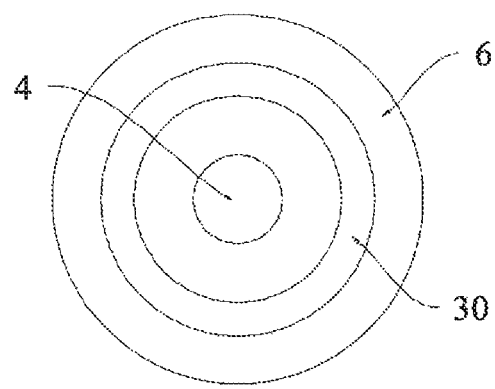
FIG. 8 is a structural diagram of a circuit board with output conductors of multiple polarities according to each embodiment.
Figure 9A:
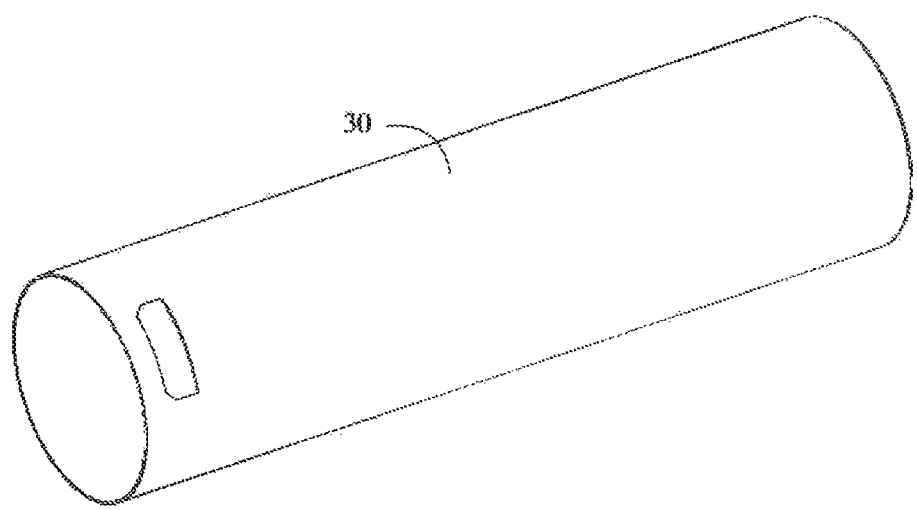
FIG. 9(a) to FIG. 9(h) are diagrams of a battery formation process of a production method according to a first embodiment.
Figure 9B:
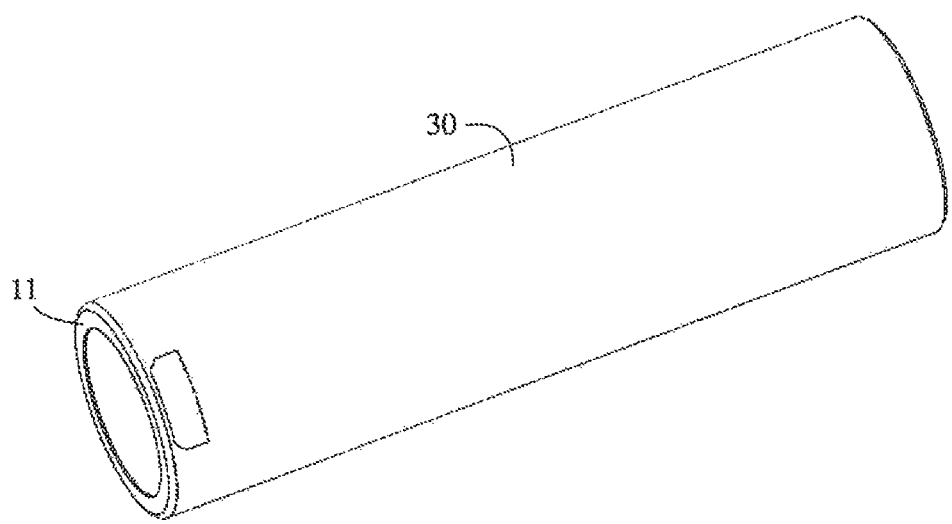
Figure 9C:
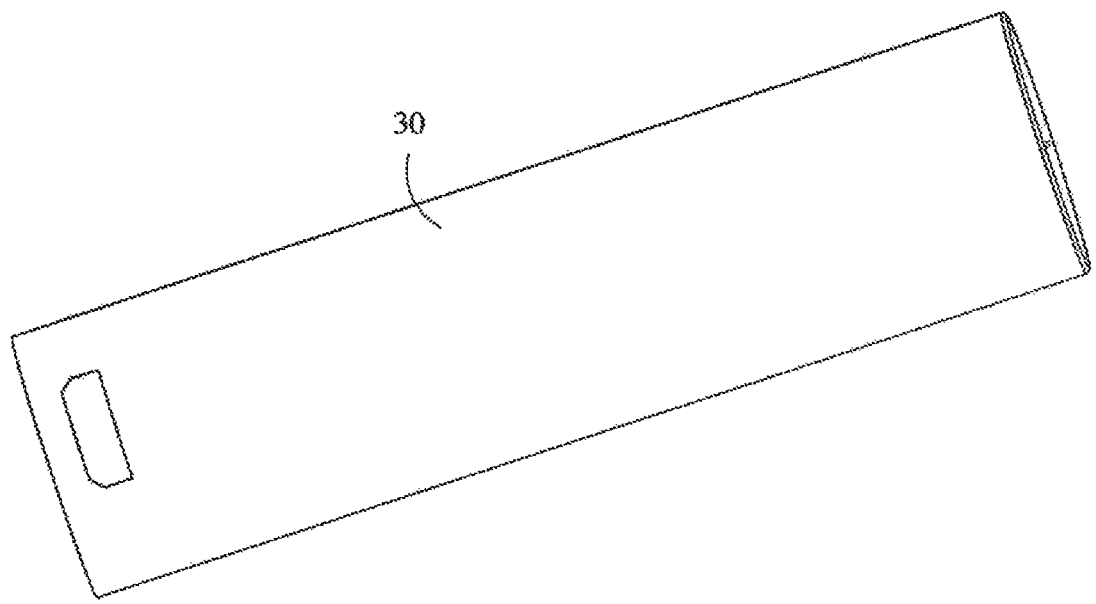
Figure 9D:
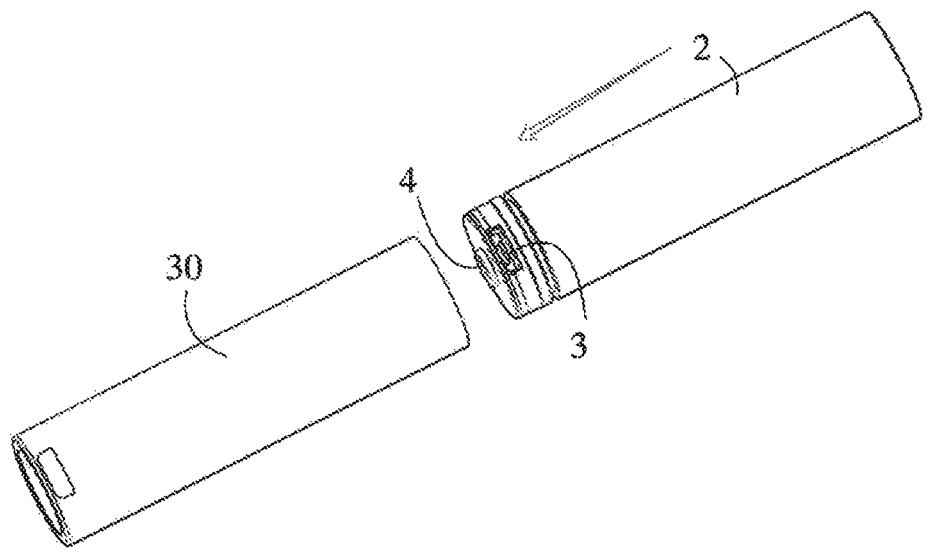
Figure 9E:
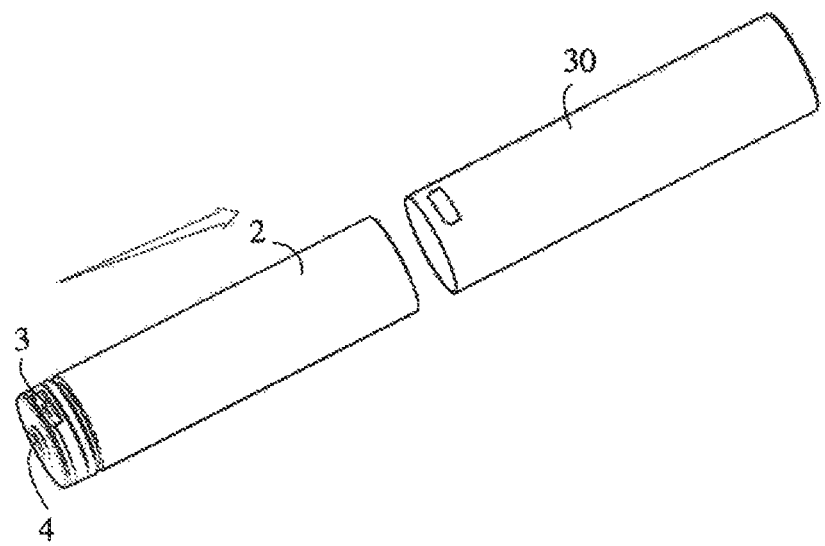
Figure 9F:
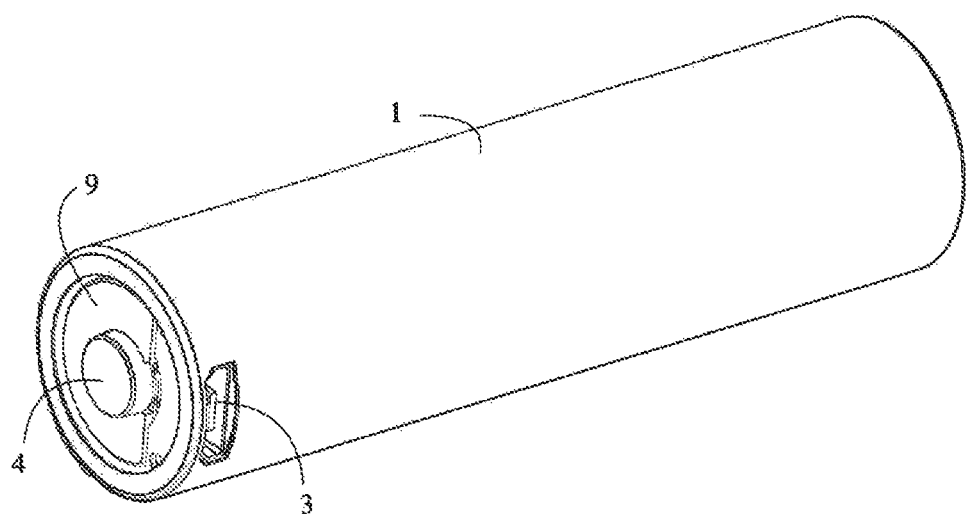
Figure 9G:
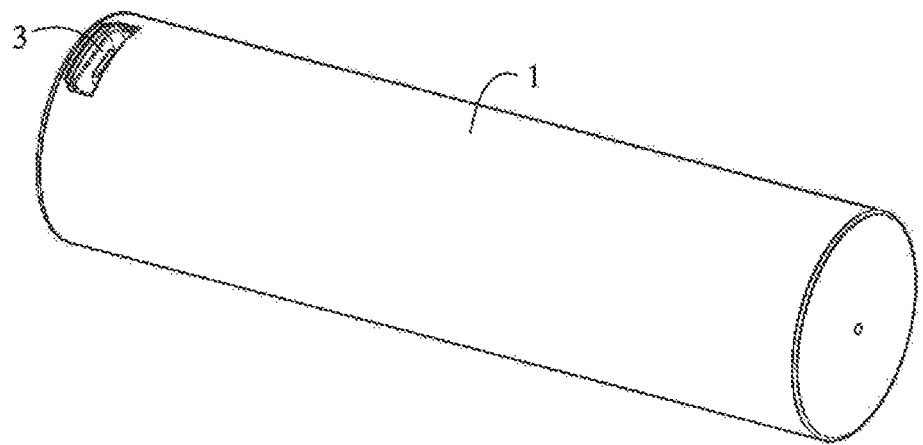
Figure 9H:
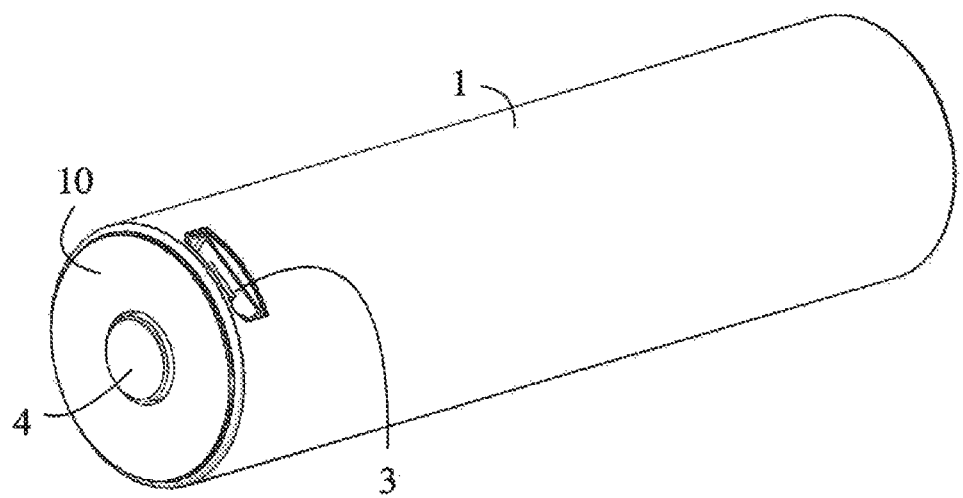

In a further embodiment, the circuit board 6 includes a plurality of output conductors including the positive electrode conductor 4. A portion of these output conductors is connected with the positive electrode of the cell 2, and a polarity of the positive electrode is positive; and the other portion of these output conductors is connected with the negative electrode of the cell 2, and a polarity of the negative electrode is negative. As such, outputs of multiple polarities from one end of the rechargeable battery may be achieved, so that external electrical equipment is relatively flexibly connected with the rechargeable battery. Particularly, all output conductors on the circuit board 6 may be metal blocks, and all the output conductors are dispersedly arranged. In this embodiment, except that the positive electrode conductor 4 is a block, other output conductors are annular conductors with different diameters. The other output conductors and the positive electrode conductor 4 are concentrically nested from the inside to the outside. Such a nesting manner brings the convenience for connection of the external electrical equipment and is strong in expandability. In addition to the positive conductor 4, the circuit board 6 shown in FIG. 8 includes an annular output conductor 30 with a negative polarity. In other embodiments, multiple turns of output conductor 30 may be provided as required, and connected to the positive electrode and the negative electrode of the cell 2 as required; respectively.

A solid conductive body such as a spring may be employed as a conductor between the output conductor on the circuit board 6 and the integrally-formed metal sleeve 1 or the cell 2 for conductive connection. A connecting manner may refer to that any position on two sides of the circuit board 6 may be connected with the cell 2, or a connecting manner refers to that the output conductor is directly connected with an end surface of the cell 2, or a connecting manner refers to that the output conductor is connected with the integrally-formed metal sleeve 1, or these three connecting manners may be performed simultaneously.

Based on the above-mentioned production method of the integrally-formed rechargeable battery, in the first embodiment, the production method includes the following steps a1 to a5.

In the step a1, one end of a metal pipe 40 is sealed by employing a metal case sealing process to form a blocking portion.

Among them, the metal pipe 40 is a raw material made into the integrally-formed metal sleeve 1. FIG. 9 (a) is an initial state diagram of a metal pipe 40. In this step, firstly, any end of the metal pipe 40 may be sealed, FIG. 9 (b) and FIG. 9 (c) are structural diagrams of a metal pipe 40 with one end sealed, wherein FIG. 9 (b) is a structural diagram after one end, which corresponds to a positive electrode of a battery, of an integrally-formed metal sleeve 1 is treated, and FIG. 9 (c) shows a structural diagram after one end, which corresponding to a negative electrode of a battery, of an integrally-formed metal sleeve 1 is treated. The metal case sealing process in this step may be spinning, stamping, edge-sealing, and the like.

In the step a2, a cell assembly is loaded into the metal pipe 40 from the other end of the metal pipe 40.

In this step, all the components included in the cell assembly are assembled in advance and then loaded into the metal pipe 40. FIG. 9 (d) and FIG. 9 (e) respectively show diagrams of an installation manner of a metal pipe 40, which correspond to those of FIG. 9 (b) and FIG. 9 (c).

In the step a3, the other end of the metal pipe 40 is sealed by employing the metal case sealing process to form another blocking portion, at this time, the metal pipe 40 is formed into the integrally-formed metal sleeve.

After the step is completed, the state of a battery is shown in FIG. 9 (e) and FIG. 9 (f).

In the step a4, a surface pad 10 is attached to the outside of the annular portion 11.

After the step is completed, the state of the battery is shown in FIG. 9 (g).

In the step a5, an outer film 20 is covered on the outside of the integrally-formed metal sleeve 1 by employing a heat shrinking technology After this step is completed, the state of the battery is shown in FIG. 9 (h).

In the second embodiment, the production method includes the following steps b1 to b4.

In the step b1, they cell assembly is loaded into a metal pipe 40.

Figure 10:
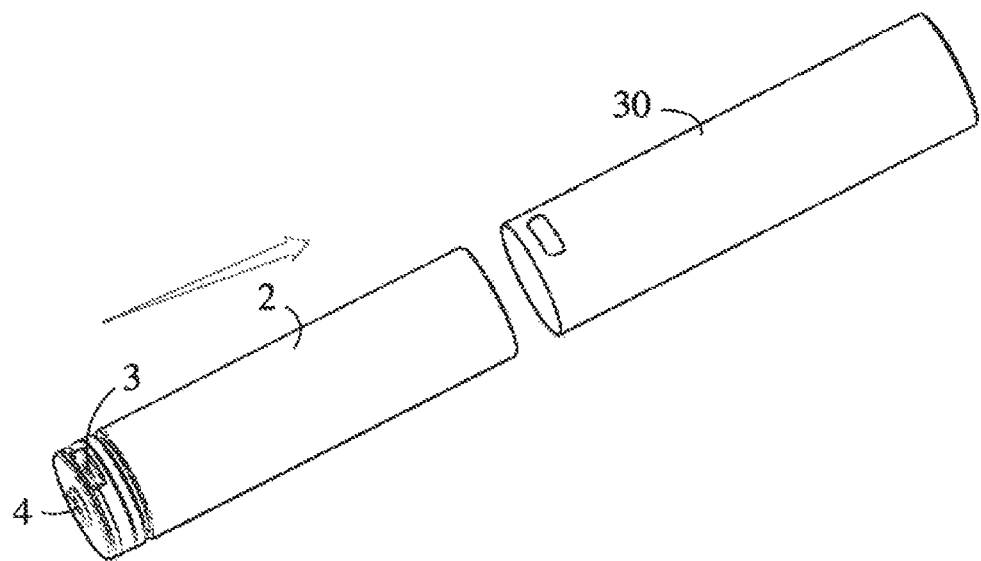
FIG. 10 is a schematic diagram of a method for loading a cell assembly into a metal pipe in a production method according to a second embodiment.

In this step, such a loading manner is shown in FIG. 10, which shows a loading direction. In actual operation, the cell assembly may further be loaded from the other end of the metal pipe 40.

In the step b2, two ends of the metal pipe 40 are sealed by employing a metal case sealing process to form blocking portions at two ends, at this time, the metal pipe 40 is formed into the integrally-formed metal sleeve.

After this step is completed, the state of a battery is shown in FIG. 9 (e) and FIG. 9 (0.

In the step a3, a surface pad 10 is attached to the outside of the annular portion 11.

After this step is completed, the state of the battery is shown in FIG. 9 (g).

In the step a4, an outer film 20 is covered on the outside of the integrally-formed metal sleeve 1 by employing a heat shrinking technology.

After this step is completed, the state of the battery is shown in FIG. 9 (h).

Further, before the above step a1 or step b1, the following step c1 is further included.

In the step c1, a plate 50 is curled into the metal pipe by employing a curling process, wherein clamping portions 51 arranged in an array are disposed on one side of the plate 50, clamping grooves 52 arranged in an array are disposed on the other side of the plate 50, and the clamping portions 51 are embedded within the clamping grooves 52 after the curling is performed.

Figure 11:
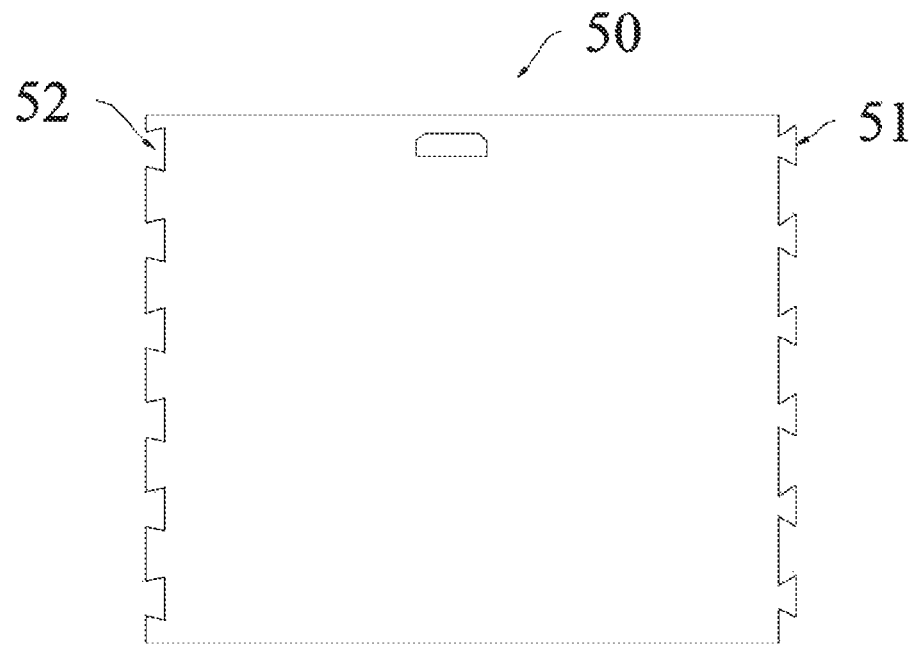
FIG. 11 is a structural diagram of a plate.

In this step, a structure of the plate 50 is shown in FIG. 11, wherein an outer contour of each of the clamping portions 51 is dovetail-shaped. Correspondingly, an inner contour of each of the clamping grooves 52 is dovetail-shaped as well. When the clamping portions 51 are embedded within the clamping portions 52, the clamping portions 51 and the clamping grooves 52 are difficult to disengage. In a preferred embodiment, welding may be performed after the curling to further ensure their reliability.

Further, before the above step b2 or step c1, an assembling process of the cell assembly is further included. The assembling process of the cell assembly includes the following steps c1 to c3.

In the step c1, the cell 2 is peeled.

In the step c2, the circuit board 6 is connected with an insulating frame 8.

In the step c3, the positive electrode conductor 4 is connected with the positive electrode of the cell 2 through a connection conductor 5.

According to the integrally-formed rechargeable battery and the production method thereof of the present invention, by providing the integrally-formed metal sleeve with end surfaces at two ends, the cell assembly is surrounded therein, in this way, the integrally-formed rechargeable battery has a smooth appearance, and enables the overall structure of a lithium battery to be reliable. A cell assembly will not loosen, and two ends of the metal sleeve have no burrs. Accordingly, no damage to an outer film of the battery or no scratch to a user will be caused.

The foregoing is only illustrative of a preferred embodiment of the present invention. It should be noted that for those ordinarily skilled in the art, a number of improvements and modifications may be made without departing from the principles of the present invention. These improvements and modifications should be regarded as a protection scope of the present invention.

What is claimed is:

1. An integrally-formed rechargeable battery, comprising an integrally-formed metal sleeve, which is a cylindrical case, wherein two ends of the integrally-formed metal sleeve are provided with inward-reversing blocking portions, and the blocking portion at at least one end is an annular portion with a hole in a middle; and a cell assembly is installed within the integrally-formed metal sleeve, and the cell assembly has a cell, a circuit board, an exposed charging interface and a positive electrode conductor; and the positive electrode conductor is exposed from the hole in the middle of the annular portion.

2. The integrally-formed rechargeable battery according to claim 1, wherein the integrally-formed metal sleeve serves as a negative electrode conductor of the rechargeable battery at the same time, and the blocking portion at one end blocks most of the one end or completely closes the one end.

3. The integrally-formed rechargeable battery according to claim 2, wherein a negative electrode of the cell is directly in contact conduction with the integrally-formed metal sleeve or connected with the integrally-formed metal sleeve through a transition conductor, and a positive electrode of the cell is connected with the positive electrode conductor through a connection conductor.

4. The integrally-formed rechargeable battery according to claim 1, wherein an output conductor of at least one polarity is disposed on the circuit board, and each output conductor is connected with a corresponding electrode of the cell.

5. The integrally-formed rechargeable battery according to claim 1, wherein the cell assembly further comprises an insulating frame separated between the cell and the circuit board.

6. The integrally-formed rechargeable battery according to claim 1, wherein an indicator light hole is provided in a side wall of the integrally-formed metal sleeve, and the circuit board further has an indicator light exposed from the indicator light hole.

7. The integrally-formed rechargeable battery according to claim 1, wherein the charging interface is formed on the circuit board by means of a sink plate installing method.

8. The integrally-formed rechargeable battery according to claim 1, wherein a negative electrode conductive ring is fixed on the circuit board, and the negative electrode conductive ring is in contact conduction with the integrally-formed metal sleeve.

9. A production method of the integrally-formed rechargeable battery according to claim 1, comprising:

sealing one end of a metal pipe by employing a metal case sealing process to form a blocking portion;

loading the cell assembly into the metal pipe from the other end of the metal pipe; and sealing the other end of the metal pipe by employing the metal case sealing process to form another blocking portion, at this time, the metal pipe is formed into the integrally-formed metal sleeve;

or, the production method comprises:

loading the cell assembly into a metal pipe; and sealing two ends of the metal pipe by employing the metal case sealing process, respectively to form blocking portions at two ends, at this time, the metal pipe is formed into the integrally-formed metal sleeve.

10. The production method of the integrally-formed rechargeable battery according to claim 9, further comprising:

curling a plate into the metal pipe by a curling process, wherein clamping portions arranged in an array are disposed at one side of the plate, clamping grooves arranged in a groove are disposed at the other side of the plate, and the clamping portions are embedded within the clamping grooves after the curling is performed.

* * * * *